United States Patent
Block et al.

(10) Patent No.: US 9,665,972 B2
(45) Date of Patent: May 30, 2017

(54) SYSTEM FOR COMPOSITING EDUCATIONAL VIDEO WITH INTERACTIVE, DYNAMICALLY RENDERED VISUAL AIDS

(71) Applicant: GOOGLE INC., Mountain View, CA (US)

(72) Inventors: Asa Jonas Ivry Block, Mountain View, CA (US); George Michael Brower, Mountain View, CA (US); Richard The, Mountain View, CA (US); Suzanne Chambers, Mountain View, CA (US); Igor Clark, Mountain View, CA (US); Glenn Cochon, Mountain View, CA (US); Isaac Blankensmith, Mountain View, CA (US); Phillip Stockton, Mountain View, CA (US); Kyle Philips, Mountain View, CA (US)

(73) Assignee: Google Inc., Mountain View, CA (US)

( * ) Notice: Subject to any disclaimer, the term of this patent is extended or adjusted under 35 U.S.C. 154(b) by 40 days.

(21) Appl. No.: 14/811,320

(22) Filed: Jul. 28, 2015

(65) Prior Publication Data
US 2017/0032562 A1    Feb. 2, 2017

(51) Int. Cl.
*G06T 15/04* (2011.01)
*G06T 7/00* (2017.01)
(Continued)

(52) U.S. Cl.
CPC ............ *G06T 15/04* (2013.01); *G06T 7/0053* (2013.01); *G06T 7/0059* (2013.01); *G06T 15/80* (2013.01);
(Continued)

(58) Field of Classification Search
CPC .............. G09G 5/14; G09G 2340/10; G09G 2340/125; G09G 5/40; G06T 11/60; H04N 5/44504; H04N 9/641
See application file for complete search history.

(56) References Cited

U.S. PATENT DOCUMENTS 8,909,740 B1 * 12/2014 Bliss ...................... G06F 1/12
                                                    709/219
8,913,068 B1 * 12/2014 Kokkevis .......... G06F 17/30905
                                                    345/522
(Continued)

OTHER PUBLICATIONS

International Search Report and Written Opinion dated Dec. 13, 2016, which issued in International Application No. PCT/US2016/041958.

*Primary Examiner* — Todd Buttram
(74) *Attorney, Agent, or Firm* — McDermott Will & Emery LLP

(57) ABSTRACT

A framework includes a scene display section configured to display a scene that includes a background layer, a video layer, and a three dimensional graphics layer on top of the video layer; and a rendering module configured as a gatekeeper that adds and removes objects to be included for rendering in the three dimensional graphics layer. The framework includes a video module configured to track playback timing of the video; and a moment module, for creating a data model for a moment having a start time, end time, identifier, and a state, configured to update the state of the moment based on the video playback timing, identified by the identifier and in accordance with the start time and the end time. Objects that are added to be included in rendering, check the state of an associated the moment, and when the state of the moment is enabled, update their display state.

11 Claims, 16 Drawing Sheets

(51) Int. Cl.
  *G06T 15/80* (2011.01)
  *H04N 21/431* (2011.01)
  *H04N 21/462* (2011.01)
  *H04N 21/488* (2011.01)

(52) U.S. Cl.
  CPC ..... *H04N 21/4316* (2013.01); *H04N 21/4622* (2013.01); *H04N 21/488* (2013.01); *G06T 2207/10016* (2013.01); *G06T 2207/10024* (2013.01); *G06T 2207/10028* (2013.01); *G06T 2215/12* (2013.01)

(56) References Cited

U.S. PATENT DOCUMENTS

| | | | |
|---|---|---|---|
| 9,052,908 B2 | 6/2015 | Fu et al. | |
| 9,069,744 B2 | 6/2015 | Worsley et al. | |
| 9,075,920 B1 | 7/2015 | Kushnirskiy | |
| 2009/0225093 A1* | 9/2009 | Harper | G06F 3/038 345/522 |
| 2010/0191459 A1* | 7/2010 | Carter | G01C 21/32 701/532 |
| 2010/0293190 A1* | 11/2010 | Kaiser | G06F 3/048 707/769 |
| 2012/0002946 A1 | 1/2012 | Antonellis et al. | |
| 2012/0140025 A1 | 6/2012 | Friedman | |
| 2012/0218381 A1* | 8/2012 | Uro | H04N 13/004 348/43 |
| 2014/0325455 A1 | 10/2014 | Tobin | |
| 2015/0074735 A1 | 3/2015 | Herigstad et al. | |
| 2015/0206348 A1* | 7/2015 | Koreeda | H04N 21/4725 345/633 |
| 2015/0309687 A1* | 10/2015 | Herigstad | H04N 21/4126 715/784 |
| 2016/0019724 A1* | 1/2016 | Verdier | H04N 13/0022 345/419 |

* cited by examiner

FIG. 11

VideoShader.fs uniform map   *uniform the texture is bound to
uniform opacity
uniform reveal
uniform power vec2 vUv  *two dimensional coordinates to look up main() {
    // returns (texel) color value of the texture for given coordinate vUv
    texel = texture2D(map, vUv)
    //returns value of function between min (0) and max (1)
    texel.a *= clamp( ( 1. − reveal ) + 1. − vUv.y, 0., 1. )
    // returns textl raised to power
    texel.a = pow (texel.a, power )
    // multiply times opacity
    texel.a *= opacity
    // returns new color value for texel
    gl_FragColor = texel
}

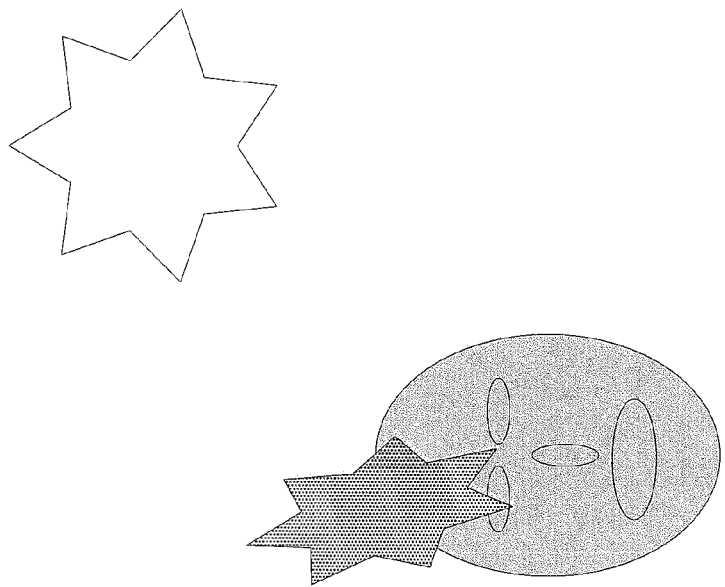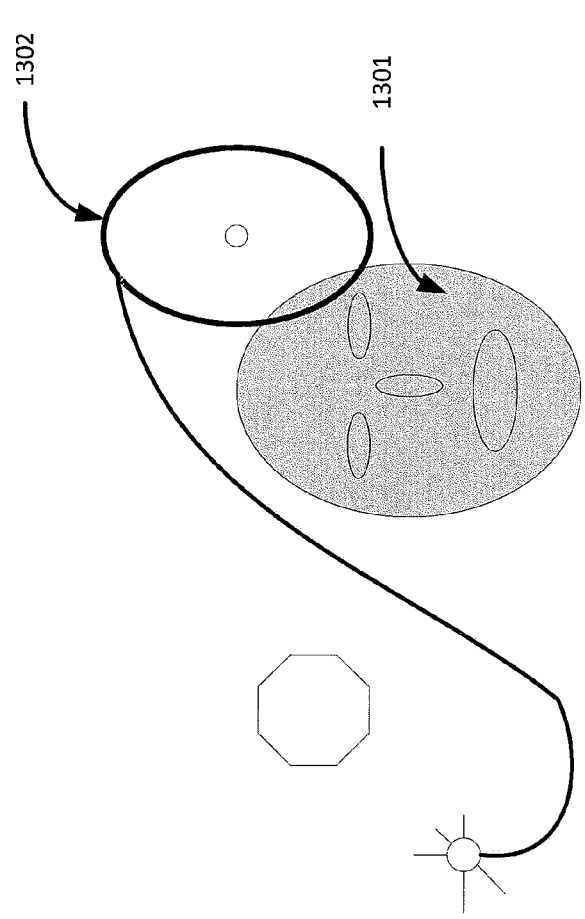
FIG. 12

SYSTEM FOR COMPOSITING EDUCATIONAL VIDEO WITH INTERACTIVE, DYNAMICALLY RENDERED VISUAL AIDS

BACKGROUND

1. Technical Field

The present disclosure relates to a system and method that enables compositing educational video with interactive, dynamically rendered visual aids.

2. Background Information

Conventional approaches to enhancing educational video include providing supporting aids that are simply accompanying text. Other conventional approaches include enhancement by adding an accompanying narration. Still other conventional approaches have included adding multiple choice questions at the end of chapters in a video. Subsequently, while the conventional approaches may help that audience gain an even deeper intuitive sense of a new idea, the audience is left to either read plain text as supporting material, or simply draw their own conclusions about the concepts with which they are presented.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

An aspect of the invention is a hierarchy of classes that may be used in developing a video composited with a two and three dimensional visualization system. An aspect of the invention is a fragment shader that allows the interactive visualization system to reveal interactive two and three dimensional graphics over the video using an alpha mask. An aspect of the invention is a class that provides functions for facilitating timing between the video and the visual system.

An aspect of the invention is video playback while three dimensional graphics are viewed from any angle by way of mouse movement. An aspect of the invention is interaction with the three dimensional graphics to reveal extra layers of information by clicking on various elements.

An aspect of the invention is a framework for compositing video with three dimensional graphics in a Web browser, comprising one or more data processing devices; at least one graphics processing unit; a display device; the one or more data processing devices configured to perform playback of the video, and the Web browser configured to send instructions to the graphics processing unit; a memory device storing a program to be executed in the Web browser; the program including: a scene display section configured to display a scene that includes a background layer, a video layer, and a three dimensional graphics layer on top of the video layer; and a rendering module configured as a gatekeeper that adds and removes objects to be included for rendering in the three dimensional graphics layer.

In a further aspect of the invention, the framework includes a video module configured to track playback timing of the video; and a moment module, for creating a data model for a moment having a start time, end time, identifier, and a state, configured to update the state of the moment based on the video playback timing, identified by the identifier and in accordance with the start time and the end time, wherein objects that are added to be included in rendering, check the state of an associated moment, and when the state of the moment is enabled, update their display state.

In a further aspect of the invention, the framework includes a scene video module configured to perform shading by a shading procedure that renders objects themselves to be displayed on top of the video layer, while displaying the video layer in the areas of the animation frame between the objects.

In a further aspect of the invention, the shading procedure includes a fragment shader that calculates the color value for texture for a given coordinate.

In a further aspect of the invention, the data model for the moment includes a camera orientation, wherein when the object determines that the status of an associated moment is enabled, the camera orientation is used to render the object.

An aspect of the invention is a method, performed by one or more processors and a display, for producing video with interactive, dynamically rendered three dimensional graphics, comprising selecting, by interacting with the display, one or more segments consisting of a sequence of video frames of video content being processed by the one or more processors, the video segments having an associated time period; for each selected video segment: setting the video segment as a middle layer, adding an interactive graphic content as a top layer associated with the segment, configuring a fragment shader to reveal the interactive graphic content on top of the video layer, and adding a background layer; and playing back the video content composited with the interactive graphic content in accordance with the fragment shader, the interactive graphic content being rendered with respect to the time period of a respective video segment.

In a further aspect of the invention, the method includes for each video segment, storing the time period for the respective video segment as a start time and an end time in a moment data object, and associating one or more graphic objects with the moment data object.

In a further aspect of the invention, the method includes storing a camera orientation in the moment data object.

In a further aspect of the invention the fragment shader calculates the color value for texture for a given coordinate.

An aspect of the invention is a method for playing back video with composited, interactive, dynamically rendered three dimensional graphics, comprising loading a video application having one or more scenes that include video content; detecting whether a scene has associated interactive graphic content, the interactive graphic content including one or more three dimensional graphic objects and a shader for revealing the three dimensional graphic objects composited with the video content; when the scene includes interactive graphic content: initializing a virtual camera and renderer; periodically updating a state of a moment variable based on a start time and an end time of the moment variable and timing of the video; while the scene is being played back, at time points in the scene, and among the one or more three dimensional graphic objects, determining whether one or more three dimensional graphic objects are to be rendered, at each video frame: the three dimensional graphic objects to be rendered checking the state of the moment variable, updating a display view of the three dimensional graphic object when the state of the moment variable indicates that it is enabled, and rendering the updated view of the three dimensional graphic object in the scene using the shader.

In a further aspect of the invention the updating of the display view of the three dimensional graphic object includes determining one or more properties of the object based on a current time relative to the start time and the end time of the moment variable.

In a further aspect of the invention a property of the one or more properties includes a position of the object, and the position is determined based on a ratio of the current time to the time period between the start time to the end time.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

These and other aspects are described with respect to the drawings. The teachings of the disclosed application can be readily understood by considering the following detailed description in conjunction with the accompanying drawings.

BRIEF DESCRIPTION OF THE DRAWINGS

FIG. 11 is a diagram showing an example fragment shader according to aspects of the invention;

FIG. 12 is a display illustrating an operation of the fragment shader according to aspects of the invention;

The figures depict embodiments of the disclosed invention for purposes of illustration only. One skilled in the art will recognize from the following discussion that alternative embodiments of the structures and methods illustrated herein may be employed without departing from the principles of the invention described herein.

DETAILED DESCRIPTION

The following description refers to the accompanying drawings. The following description is not intended to limit the scope. Instead, the scope is defined by the appended claims.

<Acronyms>

SVG—Scalable Vector Graphics.

JSON—JavaScript Object Notation

XML—eXtensible Markup Language

GPU—Graphics Processing Unit

OpenGL—Open Graphics Library: an application programming interface (API with functions and named constants) for rendering 2D and 3D vector graphics, and typically interacts with a graphics processing unit (GPU). It is often used for CAD, virtual reality, simulation, and video games (e.g., one might purchase a video game that requires a video card (example: Nvidia GeForce, AMD Radeon) that supports a version(s) of OpenGL). An alternative to OpenGL is Direct3D.

WebGL—Web Graphics Library: a JavaScript API, based on OpenGL ES 2.0, for 3D and 2D rendering using a web browser. WebGL programs include JavaScript for control and a shader that is executed by the GPU. WebGL uses GLSL for shader code.

GLSL—OpenGL Shading Language: a high level shading language that simplifies the ability of writing shaders for hardware vendor's graphics card (i.e., graphics cards that support OpenGL Shading Language.

THREE.js—a JavaScript library for 3D graphics.

HTML 5—a version of HTML that supports SVG for rendering of vector graphics.

DOM—Document Object Model.

CSS—Cascading Style Sheets

GLSL Shader—a set of strings that are passed to the hardware vendor's driver as part of an application using OpenGL.

fragment—data for a single pixel in the frame buffer.

fragment shader—GLSL code to compute color and other attributes, such as transparency, of each fragment. (See gl_FragColor in CLSL).

<System Environment>

Computer networks such as the Internet enable interconnection of various types of computing devices. An aspect is a web application that may be used to develop educational video composited with interactive, dynamically rendered visual aids. An aspect is an educational video composited with interactive, dynamically rendered visual aids.

Figure 1:
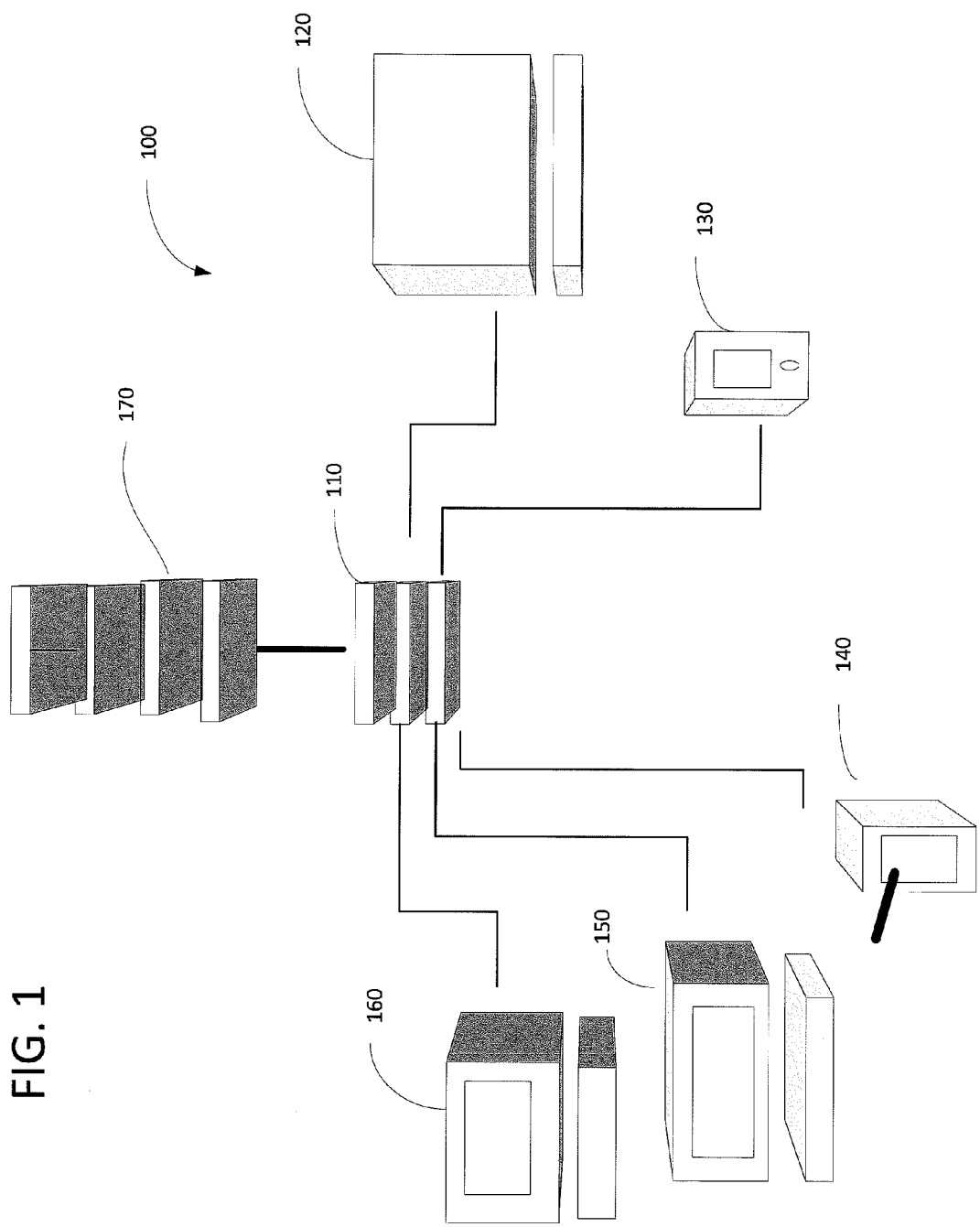
FIG. 1 is a diagram of a system environment according to aspects of the invention.

FIG. 1 shows a computer network having some types of computing devices that may be interconnected. However, one of ordinary skill would understand that there can be many other types of computing devices connected in a computing network. Subsequently, only for illustrative purposes, FIG. 1 shows desktop computers 150 and 160, tablet or Personal Digital Assistant (PDA) 140, smartphone 130, laptop computer 120, each of which are capable of connecting over the network through one or more server devices 110. The server devices 110 may be connected to backend processors 170, which may make up a data center.

Figure 2:
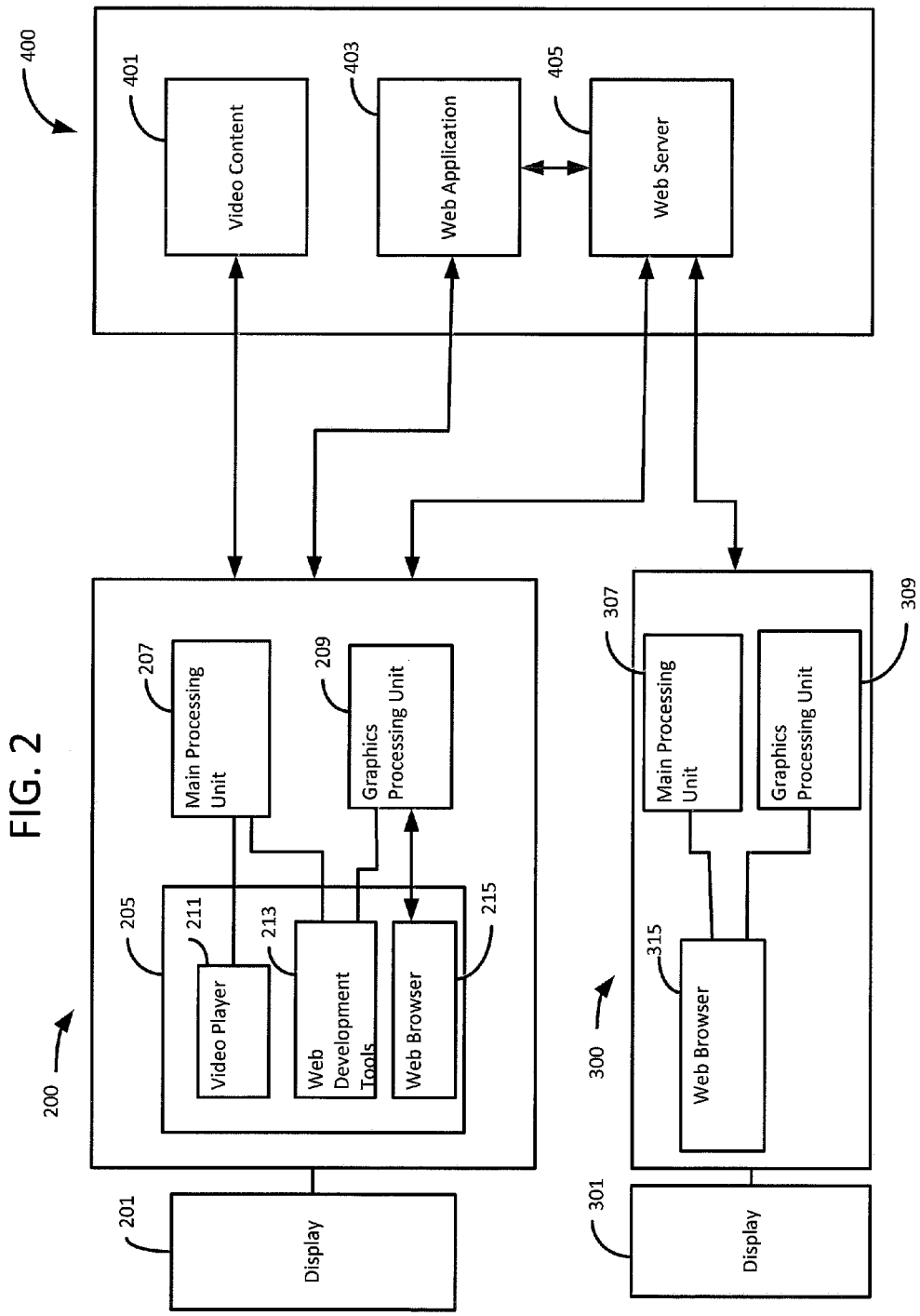
FIG. 2 is a block diagram showing a development environment and a user environment according to aspects of the invention.

FIG. 2 shows environments that may be used in the development and use of a web application, and in particular video content composited with interactive visual aids. An example of development software 205 that may be used to develop the web application may include a video player 211, Web development tools 213, and a Web browser 215. The Web browser 215 is configured to handle at least a version of HTML that can handle 3D graphics, such as HTML 5. In an example embodiment, the 3D graphics uses WebGL and a version of the THREE.js library. The Web development tools 213 may be used in the creation of HTML, JavaScript, CSS, and other technologies associated with a Web application. The Video Player 211 is configured to playback video content on a display device 201.

The 3D graphics handled by the Web browser may be processed by a GPU 209. Other HTML processing may be handled by a Main Processing Unit 207.

Once developed, the educational video composited with interactive, dynamically rendered visual aids may be executed in the Web browser 310 of a user device 300, and displayed in a display device 301. Processing of the Web browser 315 may be performed by the Main Processing Unit 307, with 3D graphics being handled by the GPU 309.

The Web application 403 may be served by a Web server 405. Video Content 401 may be stored and distributed by a server system 400.

The server system 400 may include several processors for performing Video Content distribution 401, and performing the Web server 405 and Web application 403.

<Compositing System Framework>

An aspect of the invention is a hierarchy of core classes that may be used in development of a video composited with an interactive visualization system. Although example classes are provided, the example classes represent an approach to grouping parameters and functions, and alternative groupings are possible. For example, the hierarchy of classes may be flattened, by combining functions from classes that inherit from a respective parent class.

Also, the hierarchy of classes may be implemented in any of several languages that can be executed by the Web browser 215. An example embodiment is a hierarchy of JavaScript classes. However, any programming language that can be processed by the Web browser 215 and that can support 3D graphics may be used. The JavaScript classes may be downloaded with a Web page from the Web server 405. Alternatively, the JavaScript classes may be distributed on a computer-readable storage medium, or may be distributed as a self-contained app.

Figure 3:
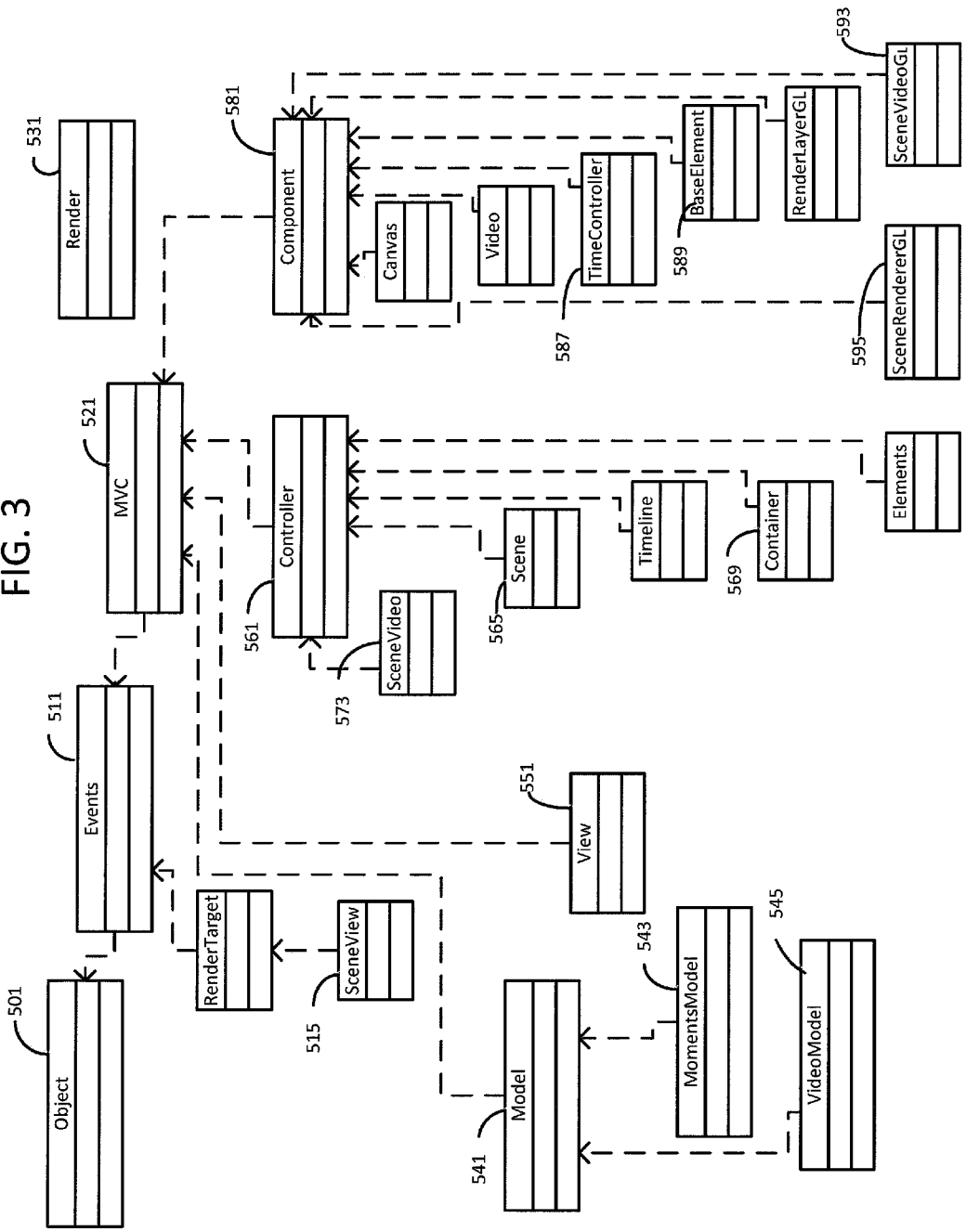
FIG. 3 is a class relationship diagram showing classes as a basis for development of video composited with interactive visualization system according to aspects of the invention.

FIG. 3 shows an example of classes that may be used in development of a video composited with an interactive visualization system. Under a topmost class, Object 501, and a class, Events 511, the system architecture may take the form of model-view-controller, in a MVC class 521, having dependent classes Model 541, View 551, Controller 561, as well as Component 581. The Component class 571 may include special functions related to video or 3D graphics, or a combination of video and 3D graphics that make up objects for a scene.

The MVC class 521 may include a generic function to create a classes object, and provide a function to create a classes object having a unique timestamp.

A Moments Model class 543 and a Video Model class 545 are types of the class Model 541. These classes, together with a Render class 531 and a Scene Video GL class 593 are core classes that enable compositing of a video with interactive, dynamically rendered 3D graphics, also referred to as a scene. The Video Model class 545 tracks the video's time. The Moments Model class 543 correlates timing of video playback with timing of display of the 3D scene. The Render class 531 enables every 3D graphics element to update in a manner that is synchronized with each other. The Scene Video GL class 593 is for rendering the video visually in the 3D graphics scene.

Figure 4:
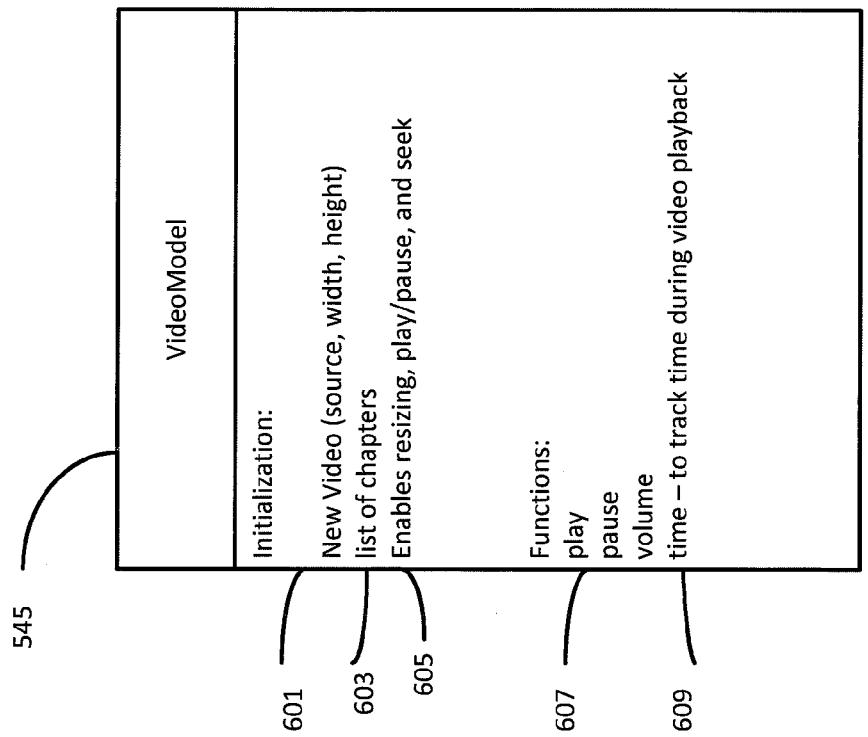
FIG. 4 is a diagram showing an example VideoModel class according to aspects of the invention.

An example of a Video Model class 545 is shown in FIG. 4. The Video Model class 545 may provide a function to create a new video object 601 having one or more chapters, and functions to enable various events 603, such as resizing, play/pause and seek. The Video Model class 545 may include corresponding functions 605 to control the video, as well as a function that tracks time during video playback 607.

As will be described later, rendering of a video composited with 3D graphics is performed by way of a render loop which renders a frame in the scene at each pass through the loop. In an example embodiment, the render loop is implemented using a requestAnimationFrame function that is handled by the browser. The requestAnimationFrame function may differ between browsers, such as WebKit or mozilla based browsers. As such, in an example embodiment, the requestAnimationFrame function may be implemented by making calls to the appropriate function for the browser. An aspect of the invention is a Render class 531.

Figure 5:
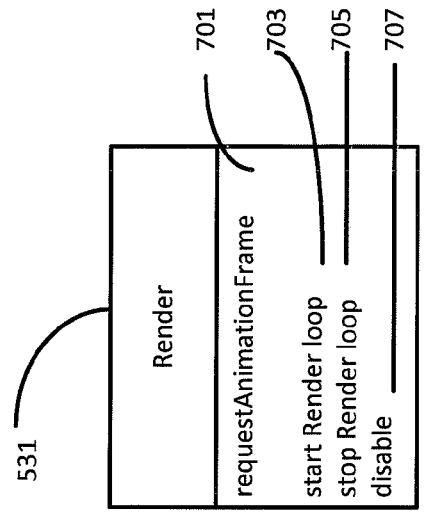
FIG. 5 is a diagram showing an example Render class according to aspects of the invention.

An example of a Render class 531 is shown in FIG. 5. The Render class 531 acts as a gatekeeper to a requestAnimationFrame render loop. Graphic elements may add themselves to a list of objects to be rendered in the render loop by calling a start loop function. Graphic elements may remove themselves from the rendering list by calling a stop loop function. The Render class 531 enables control over objects that have been added to the rendering list in the case that the Web application is paused or terminated. When the application is paused or terminated, the Render class 531 is disabled, which stops invocation of all added objects on the rendering list. In an example embodiment, the Render class 531 may include functions that can be used in control of rendering, including a call to requestAnimationFrame 701, a function 703 that an object may call to add itself to the rendering list, a function 705 that an object may call to remove itself from the rendering list; and a function 707 to disable rendering.

Figure 6:
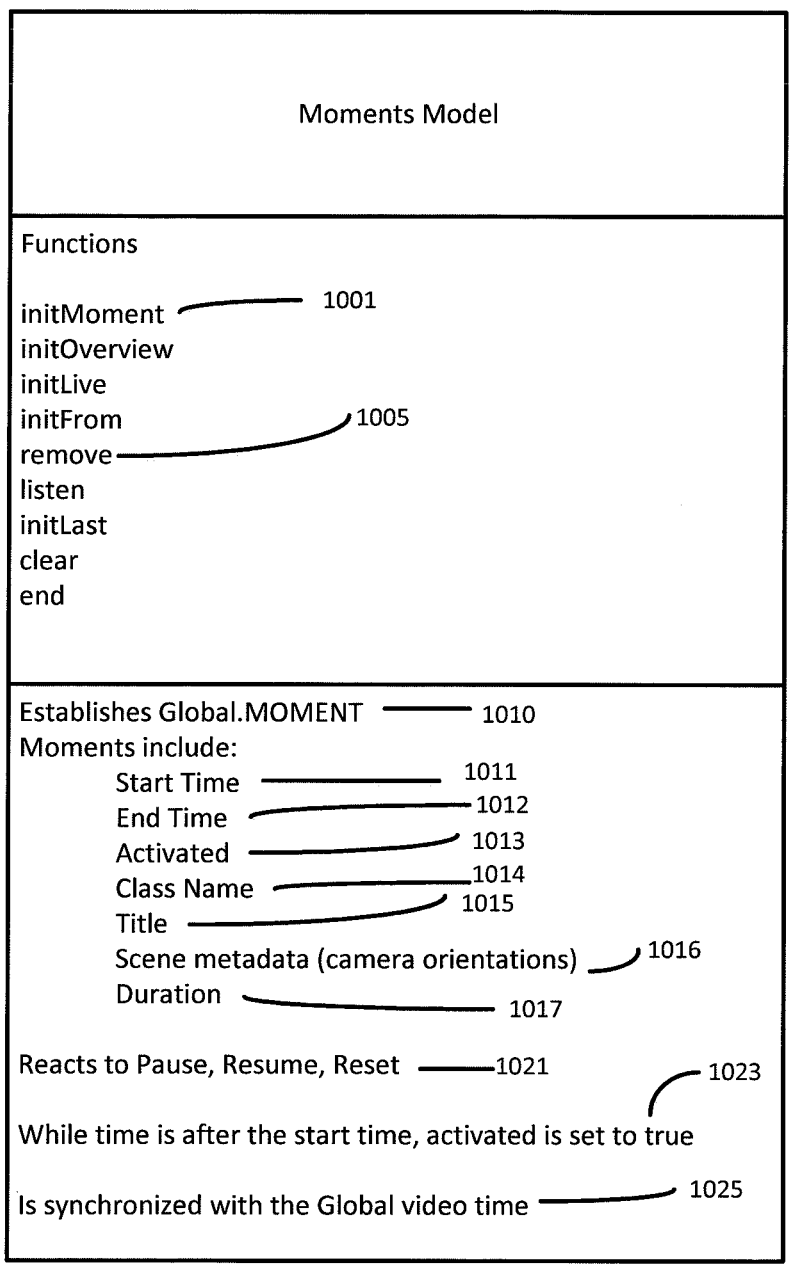
FIG. 6 is a diagram showing an example Moments class according to aspects of the invention.

The Moments Model class 543 enables creation of moments of 3D graphic activity that is to occur during video playback. A moment object includes a start time, and end time, duration, and a name identifier. The start time and end time correspond to time points in the video, and may be created during or after the video has been edited. Moments thus represent planned times when extra layers of information, including 3D animation, are to enter into and leave from a scene. As seen in FIG. 6, a moment includes a start time 1011, an end time 1012, a boolean flag, activated 1013, that indicates the state of the moment in the scene, a name identifier 1014, a title 1015, scene metadata 1016 such as camera orientations, and a duration 1017.

In the Moments Model, unlike a typical event model in which events are broadcasted, each moment that is created has a state 1013 to indicate that the moment is currently happening (activated).

Moments monitor a clock 1025 that is associated with the Video. Moments update 1023 their status such that while time is after the start time, the state of the moment will be set to activated. The boolean state of each moment is checked by objects that have added themselves to the rendering list each cycle of a rendering loop for a scene. In other words, objects in the rendering list only need to check the state each moment of interest to determine if they can update their display. Moments may react to Pause, Resume, Reset functions 1021.

The Moments Model class 543 may include a function to set the state of a Moment 1001 to activated, as well as a function to remove a Moment 1005, or clear all Moments 1007.

Various Views of the class View 551 may be created depending on the application. Types of Views may include a Scene View, an animation view, and an expanded information view.

Figure 7:
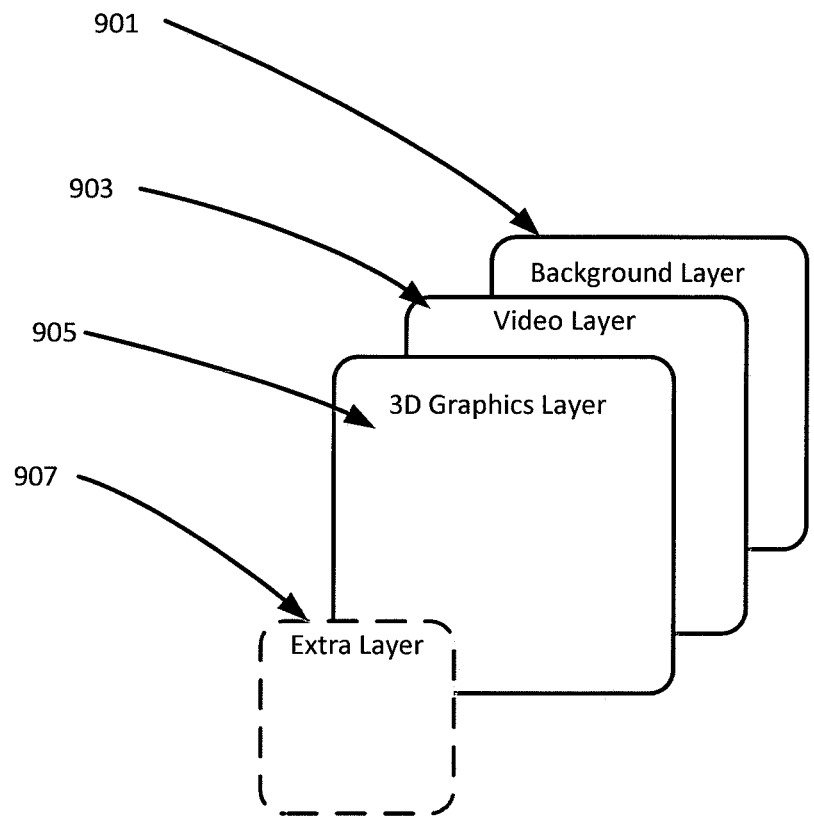
FIG. 7 is a diagram showing display layers according to aspects of the invention.

An aspect of the invention is displaying views as layers. FIG. 7 shows an example in which the layers include a background layer 901, a Video layer 903, and a 3D graphics layer 905. The background layer 901 and the 3D graphic layer may be included in cases where a 3D animation is to be shown based on activated moments. In addition, upon receiving a selection event on a displayed element of the 3D graphics in the graphic layer 905, an extra information layer 907 may be added as a layer above the 3D graphic layer 905. The extra information layer 907 may show text or video.

In an embodiment, the Video layer 903 is a hidden layer, and video contents of the layer are rendered by shaders in the WebGL pipeline. Other 3D graphics layers are rendered by their respective shaders in the same WebGL pipeline, such that the 3D graphics layers appear as layers on top of the video.

Figure 8:
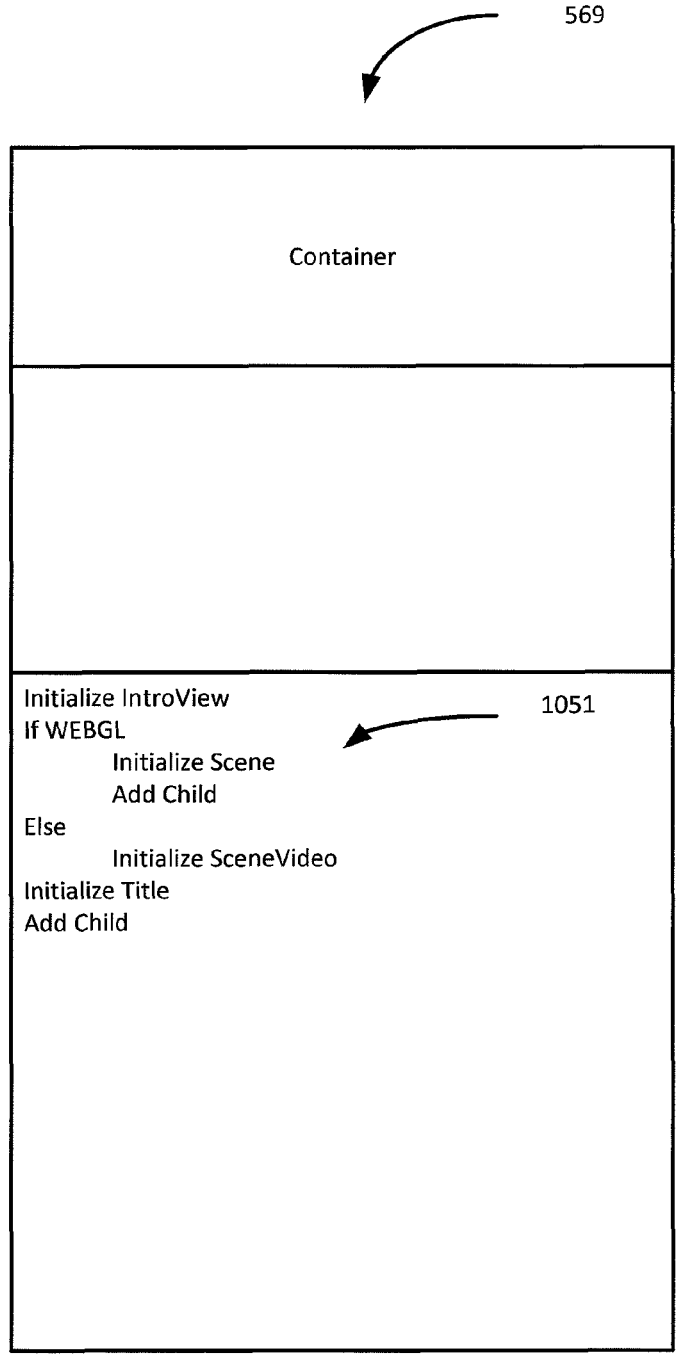
FIG. 8 is a diagram for an example Container class according to aspects of the invention.

A Container class 569, as shown in FIG. 8, may include a function 1051 to detect that a scene includes 3D graphics, or is a portion of video standing alone. A type of Controller 561, for example, a Scene controller 565 may include the functions for a video segment that includes 3D graphics, while an alternative Controller 561, for example a Scene Video controller 573 may be used to control the video.

Figure 9:
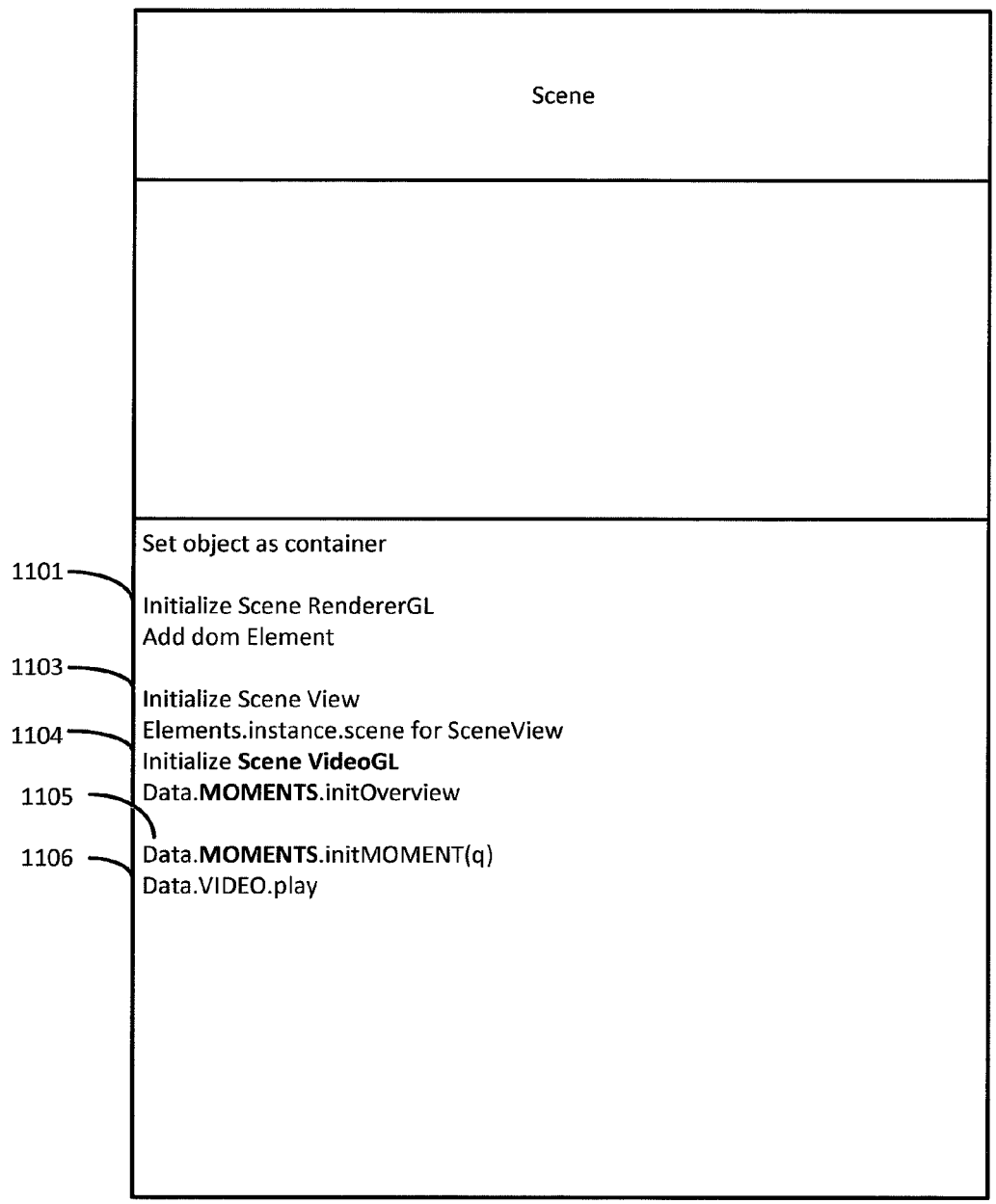
FIG. 9 is a diagram for an example Scene class according to aspects of the invention.

FIG. 9 show an example of the Scene controller class 565. In the case of the Scene controller class 565, a Scene Renderer class for 3D graphics 595 is initialized 1101, a Scene View 515 is initialized 1103, a Scene Video class for 3D graphics 593 is initialized 1104, a Moment is initialized 1105. Also, the video is instructed to play 1106. The Scene Video class for 3D graphics 593 includes functions for establishing a scene that includes both video and 3D graphics.

Figure 10:
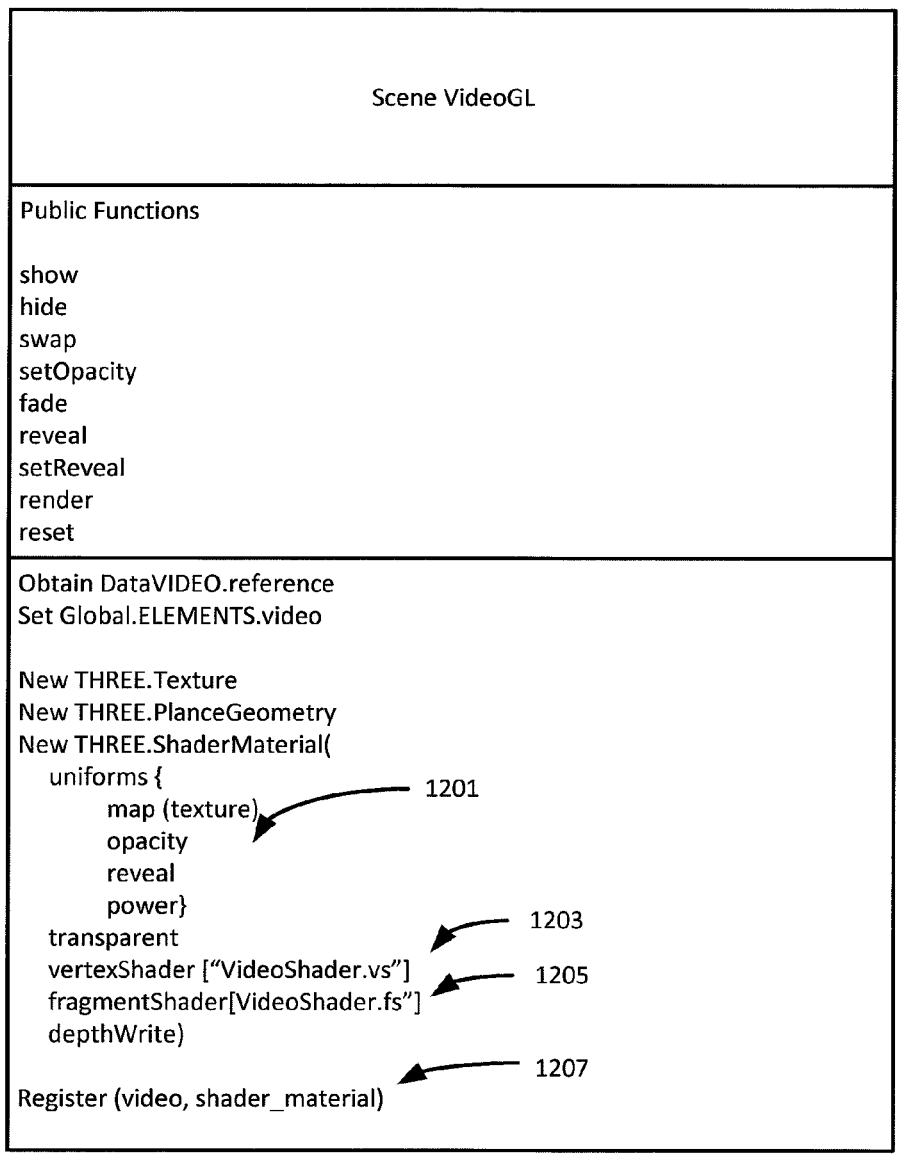
FIG. 10 is a diagram for an example SceneVideoGL class according to aspects of the invention.

FIG. 10 show an example of a Scene Video class for 3D graphics 593. Functions for setting shader material may be included in this class. The Scene Video class for 3D graphics 593 may set a vertexShader 1203 and a fragment shader 1205, and register the shaders with the video 1207. A set of parameters, referred to as uniforms 1201, may be used by the shaders in performing their respective calculations.

Typically shaders are used to create effects in the display. In the case of the Scene Video class for 3D graphics 593, the shaders are used to reveal the 3D graphics as layers 905 on top of the video layer 903.

FIG. 11 shows an example fragment shader that calculates the color value for the texture for a given coordinate, that enables the 3D graphics to be shown as layers on top of the video layer, such that the objects themselves are rendered, while displaying the video layer in the areas of the animation frame between the objects.

For example, as may be seen in FIG. 12, the video layer 1301 will be visible through the 3D graphics layer except for the 3D objects 1302 themselves. The 3D graphic objects may be displayed and interacted with, while a transparency formed by the shader allows the video to be displayed in areas where there are no 3D objects 1202. Subsequently, the 3D objects 1302 appear to bleed through the video 1301.

<Creation of Composited Video with Interactive, Dynamically Rendered Visual Aids>

Figure 13:
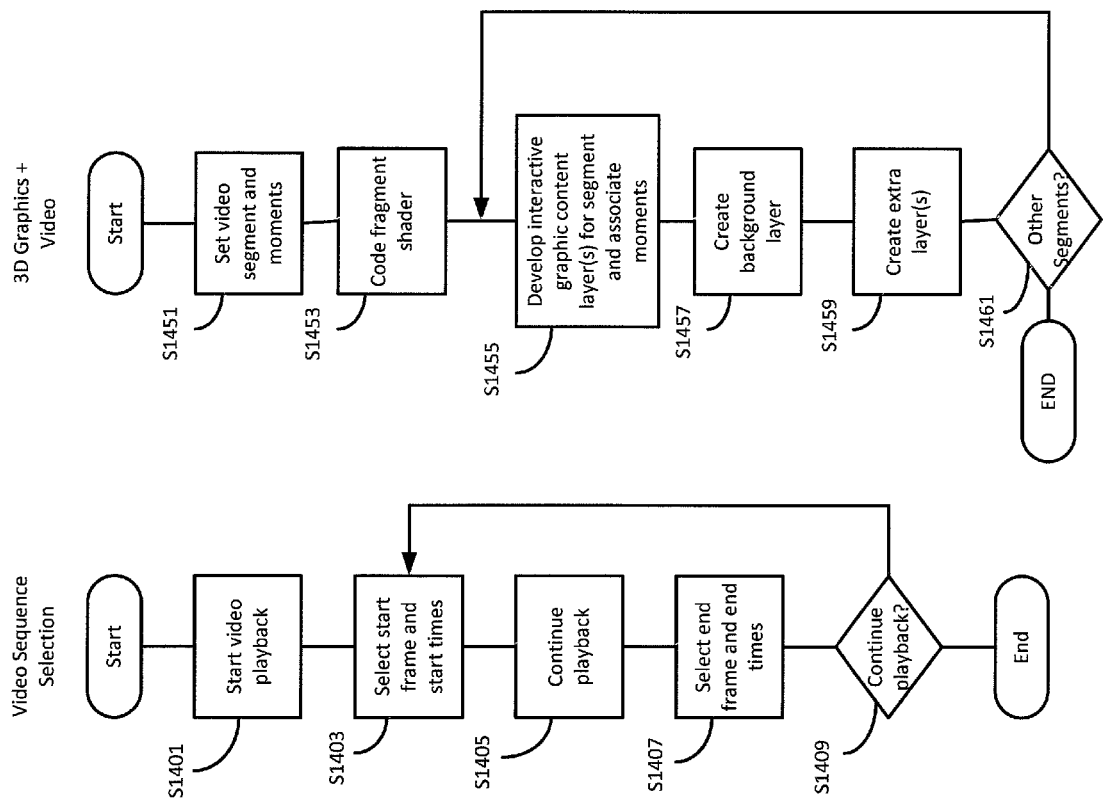
FIG. 13 is a flowchart for development of a video composited with an interactive visualization system according to aspects of the invention.

An aspect is the creation (DEVELOPMENT) of a video composited with interactive, dynamically rendered 3D graphics. FIG. 13 is a flowchart for creation of video composited with 3D graphics. An aspect is to start with an educational video that one wishes to enhance with a capability to explore deeper into the video content. A video player, such as software-based video player 211 may be used to control playback the video S1401. The video player 211 may provide functions, such as pause, backup, resume, as well as provide indications as to frame id for a paused frame.

As a video is being played back, a frame may be selected, at step S1403, as a start frame at which a 3D graphic may be composited with the video that may enhance a user experience with a scene starting from the selected frame. At step S1403, a start time may be designated for a moment(s). At step S1405, as the video resumes playback from the selected frame, at step S1407, an end frame may be selected as an end point for a composited 3D graphic. In addition, at step S1407, end times will be designated for moments. At step S1409, playback may be continued in order to select other start and end frames at which 3D graphics are to be composited, and to designate start and end times for moments.

An aspect is creation of 3D graphics that may be incorporated over a duration of particular start and end frames that have been previously selected. As an alternative, 3D graphics may be created without determining the start and end frames in advance. Interactive 3D graphics that may be created without specific knowledge of where the 3D graphics may be incorporated in the video timeline. An aspect may be to select a sequence of video frames that may be best suitable for the previously created 3D graphics.

Assuming a start frame and an end frame, one or more moments may be set, at step S1451. Moments at this point may be set to include an identifier, a start time and an end time. Moments represent periods of time in which 3D graphic objects associated with the moment are to be updated and rendered.

At step S1453, it may be necessary to provide particular shaders. Shaders may be programmed using GLSL. An example fragment shader is shown in FIG. 11.

At step S1455, an interactive 3D graphic may be created for the video segment. The class framework of FIG. 3 may serve as a basis for creating an interactive 3D graphic. New elements may be added as subclasses of the Component class 581, or particular subclasses of the BaseElement class 589. Also, at step S1455, 3D graphics that are created may be associated with one or more moments that were set in step S1451.

At step S1457, a background layer 901 may be created as a layer that may be shown from behind the video layer 903. The background layer may be a simple still image(s).

The class framework provides a capability of showing an extra layer(s) 907 as a layer(s) above the 3D graphics layer 905 upon selection of particular 3D objects, or group of 3D objects. At step S1459, one or more extra layers may be created.

At step S1461, steps for creation of 3D graphics for other moments may be performed.

<Compositing Educational Video with Interactive, Dynamically Rendered Visual Aids>

3D graphics may be rendered independently of a video during video playback as animation frames in a dedicated portion of a display screen showing the video. Typically, the dedicated portion of the display screen is a rectangle, and the rectangle portion blocks that portion of the video from being displayed. Alternatively, a display screen may be divided into regions, one region for showing the video, and another region for showing a 3D graphic. The divided regions may have different functions for handling events.

An aspect of the invention is compositing video with interactive, dynamically rendered 3D graphics in a manner that 3D graphic objects appear to be revealed on top of the video, and may be interacted with during video playback. In other words, as discussed with respect to FIGS. 11 and 12, a fragment shader is applied such that only the 3D graphic objects themselves are revealed on top of the video.

Another aspect of the invention is timing coordination between 3D graphics and video playback. In an example embodiment, a video is rendered in the 3D graphics environment, for example in WebGL, by execution of a render loop at each frame. In an example embodiment, the Three.js library is used to carry out 3D graphics in WebGL. Three.js provides functions for creating a scene, a camera, and a renderer, in order to render the scene with the camera. At the beginning of each cycle of the render loop, a call is made to requestAnimationFrame. Then, a call is made a function in every 3D graphic object and Three.js render function, which includes a function for adding 3D view objects and a function for removing 3D view objects from being called at an interval of, for example 60 frames per second.

Figure 14:
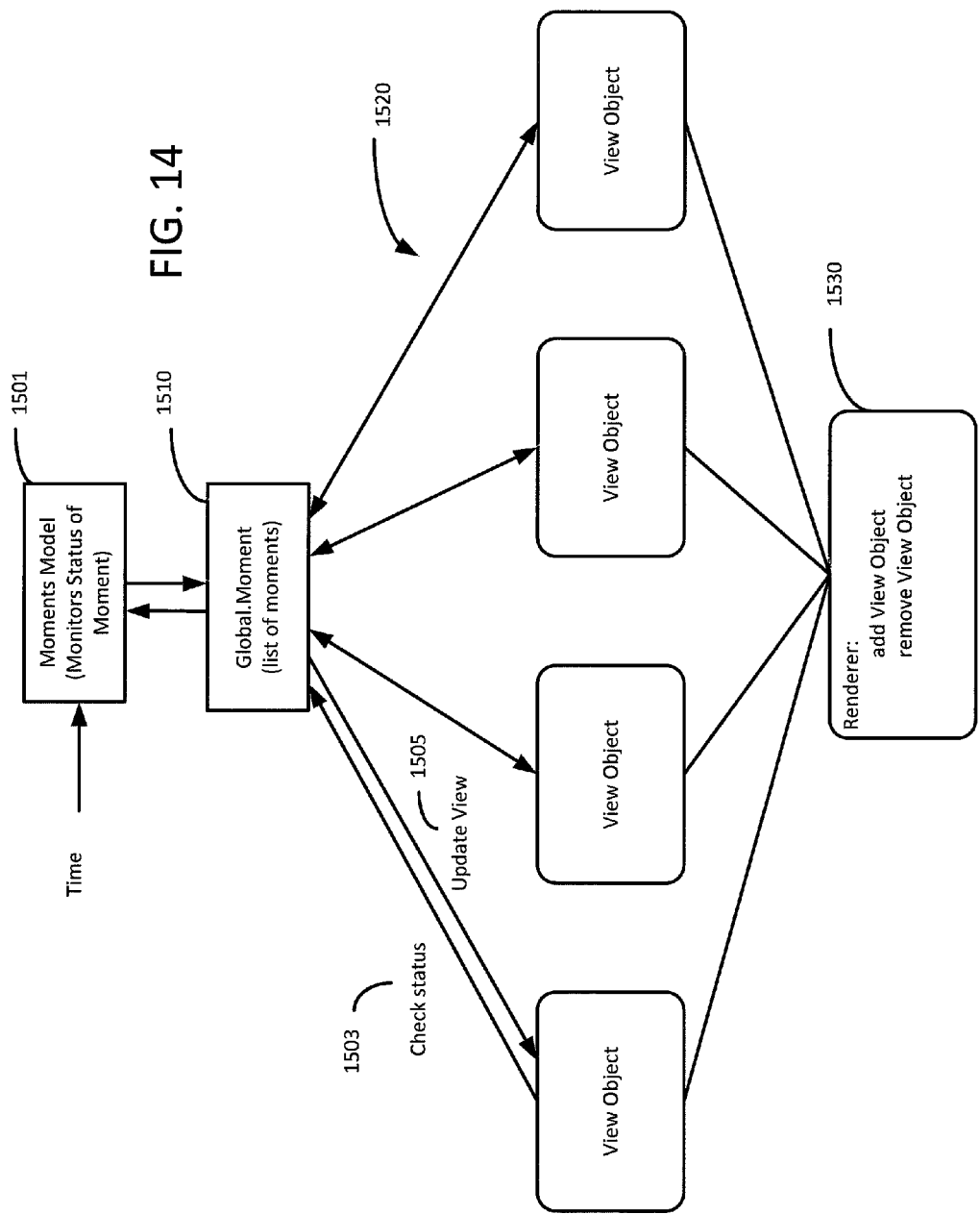
FIG. 14 is a diagram showing a Moments model in a render loop according to aspects of the invention.

Coordination of timing of rendering of 3D graphic objects with video playback timing is made by way of an associated moment. FIG. 14 shows an example of coordination between moments and 3D view objects. Rather than a typical event model that broadcasts events as they occur, the 3D view objects themselves check a Global moment variable for the status of moments listed in the variable. There may be one or more moments that a 3D view object is associated with. If there is at least one Moment (activated) that the 3D view object is associated with, the 3D View Object updates its view and is rendered. Such a model enables, for example, movement of 3D objects to any angle while a video is being played back. In such case 3D objects are rendered as long as their associated moment is activated. Use of the moment model provides improved performance because there is no event propagation adding listener function calls on the call back stack.

In an example embodiment, 3D view objects are Three.js objects, which relate to WebGL buffer objects. During runtime, these objects may be shown or hidden, have their coordinate-positions modified or directly have their shader uniforms modified. In some cases, 3D view objects may be DOM elements that have their CSS modified by JavaScript based on its current state.

In an example embodiment, the render loop is responsible for repeatedly calling a function on every 3D view object. The Render class 531 includes a Render start function and a Render stop function for adding and removing 3D object views from being called on an interval (for example 60 frames per second). The function checks the status of associated one or more moments and performs an update of the 3D view object based on the status.

As can be seen in FIG. 14, 3D view objects 1520 that have been added to a rendering list check the status 1503 of one or more associated moment(s) 1510. In an example embodiment, moments may be maintained in a list contained in a Global Moment variable. In the case that an associated moment is activated, the 3D view object will update 1505. Updating of the 3D view object may be in accordance with the start time and the end time in the associated moment. In addition, each Moment may include a title 1015 and scene metadata 1016, such as camera orientation. As an example, the position of the 3D view object may be determined in accordance with the amount of time that has elapsed from the start time stored in the associated moment. A Moments Model 1501 tracks the playback time of the video, and updates the status of the moments based on the time.

Figure 15:
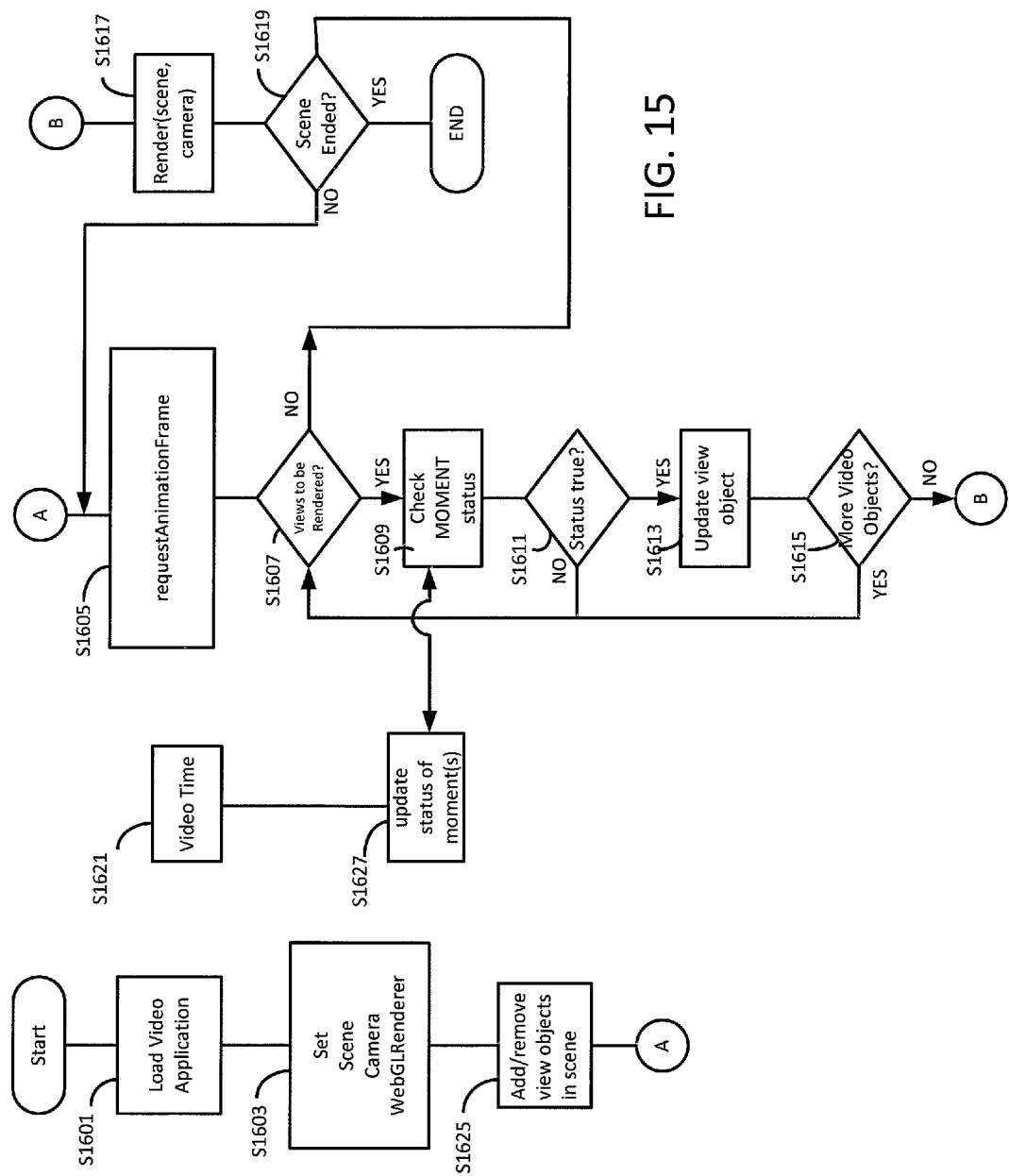
FIG. 15 is a flowchart for timing control for the video composited with the interactive visualization system according to aspects of the invention.

FIG. 15 shows the coordination between video playback and rendering of 3D graphics of FIG. 14 from the perspective of a flowchart. Rendering of 3D graphics is performed in real time. Real time in this case means 3D graphics is rendered within the timing of the video playback (for example, 60 fps). At step S1601 a video application is loaded to be performed by a Web browser, such as Web browser 315. The video application may include one or more scenes that include 3D graphics. Upon loading, in the case of a scene that includes 3D graphics, in step S1603, a scene object, camera object, and WebGLRenderer object may be created. The WebGLRender is a set of functions provided in the THREE.js library. Alternative functions may be used to provide rendering for 3D graphics.

In an example embodiment, timing of video playback is monitored by a Moments Model 543. Thus, at step S1621, video time is monitored, and at S1627, the status of moments are updated based on their respective start time and end time.

The Render object 531 serves as a gatekeeper for adding and removing 3D view objects to be included in the scene. In the example embodiment, 3D view objects that have been added to a scene, are initially hidden. Subsequently, at step S1625, 3D view objects are added or removed as objects to be rendered in a scene.

The render loop is performed for each frame based on a call to requestAnimationFrame, at step S1605. At step S1607, a check is made to determine if there are 3D view objects to be rendered. If NO at step S1607, the check for end of scene is made at step S1619. If YES at step S1607, any Moment objects associated with the view object are checked, at step S1609, to determine if it is activated. If a Moment object indicates activated, YES at step S1611, the 3D view object is updated at step S1613. Updating of a 3D view object may include updating properties of the objects, such as uniforms and transparency. Updating properties of objects, instead of adding or removing objects, is good for performance, as it avoids construction of objects during playback, which may cause video playback to shutter. Also, since objects are not created and removed frequently, unnecessary garbage collection is avoided. In addition, updating of a 3D view object may update properties of an object, such as position, size, based on a current time that is between the start time and the end time of the associated moment object.

At step S1615, a check is made as to whether there are more views. If there are no more view objects in the scene, at step S1617, the scene is rendered. Otherwise, steps may be repeated for other view objects in the scene.

As the scene is running, at step S1619, it is determined whether the scene has ended. If YES at step S1619, the render loop ends for the scene. Otherwise (NO at step S1619), as the scene is running, the render loop is repeated, including a call to a render function of every 3D view object and called Three.js WebGLRenderers render (scene,camera) function.

Figure 16:
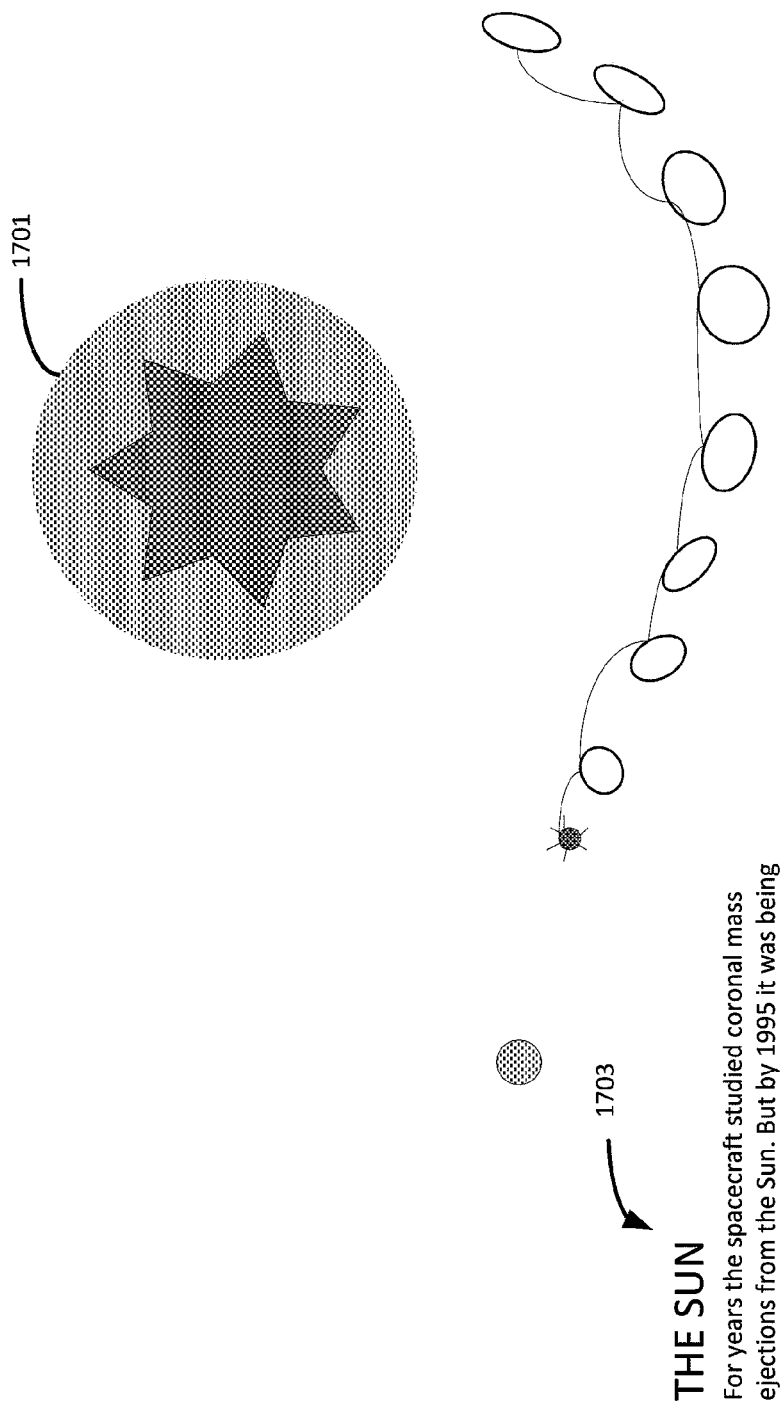
FIG. 16 is a display illustrating an example extra view layer.

An aspect of the invention is a capability of including extra layers of information, which may be brought into view by clicking on various elements of the interactive 3D graphics. FIG. 16 shows an example of an extra layer 1703 that may be displayed upon clicking on the Sun object 1701.

Example 1

The framework, as shown in FIG. 3 has been used to enhance an educational video about a space satellite. The educational video was implemented as a web-based interactive documentary that follows the story of a lost satellite. The user experience included interactive 3D graphics to illuminate the concepts of orbit, propulsion and data collection mechanisms used by NASA scientists over the course of the spacecraft's journey. As the user interacts with these aids, they're presented with a filmed explanation from the very astrophysicists responsible for the innovations being taught. Extra layers of information could be accessed by selecting particular 3D elements.

The documentary video was divided into chapters, and in some cases segments within chapters. Base elements, such as Comet, Dot, Earth, Satellite, Sun, Stars, and Trajectory were created using WebGL as sub-classes of the Base Element class 589. Provided the base elements, interactive, dynamically rendered 3D graphics for chapters and segments within chapters were created as sub-classes of the TimeController class 587. Animations were created as sub-classes of the View class 551.

The documentary video may include a chapter, "Comet chaser". (see FIG. 12). The Chapter may have a moment, "comet moment", where the comet moves its position into view and later out of view. The Chapter may have another moment, in which titles come into view to introduce the speakers in the video. The Chapter may refer to global elements, such as a comet element, stars element, sun element, earth element, and lines that are drawn showing trajectories. The animation loop may include rotation of objects, and drawing of the trajectory lines based on the progress during the moment.

Example 2

Using the same framework, as shown in FIG. 3, any educational context that may benefit from the combination of interactivity with video. For example, electronic textbooks, popular science documentaries, online learning, interactive infographics common to publications, explanations of hardware features of a smartphone.

As an example, one may imagine Human Weapon, a broadcast television show that explores the science, anatomy and physics behind different martial arts practices.

Filmed segments may be prepared that show live-action martial artists demonstrating the techniques of their particular "school" of combat.

Following these filmed segments, the practices may be recreated on the Web using computer generated renderings. The computer generated renderings might show slow motion animations or reveal cutaways of bones or muscle groups involved in a given maneuver.

This live action video content may be played in conjunction with an interactive version of the Computer Graphics rendering.

The user may be provided with a capability to virtually orbit around the 3D model of the martial artist.

The user may choose from different levels of cutaways: skin, muscular system, skeleton.

The user may select different parts of the anatomical 3D model to get information about relevant parts of the human body: How much force does this muscle generate? What is the velocity of this limb?

<Example Computing Device>

Figure 17:
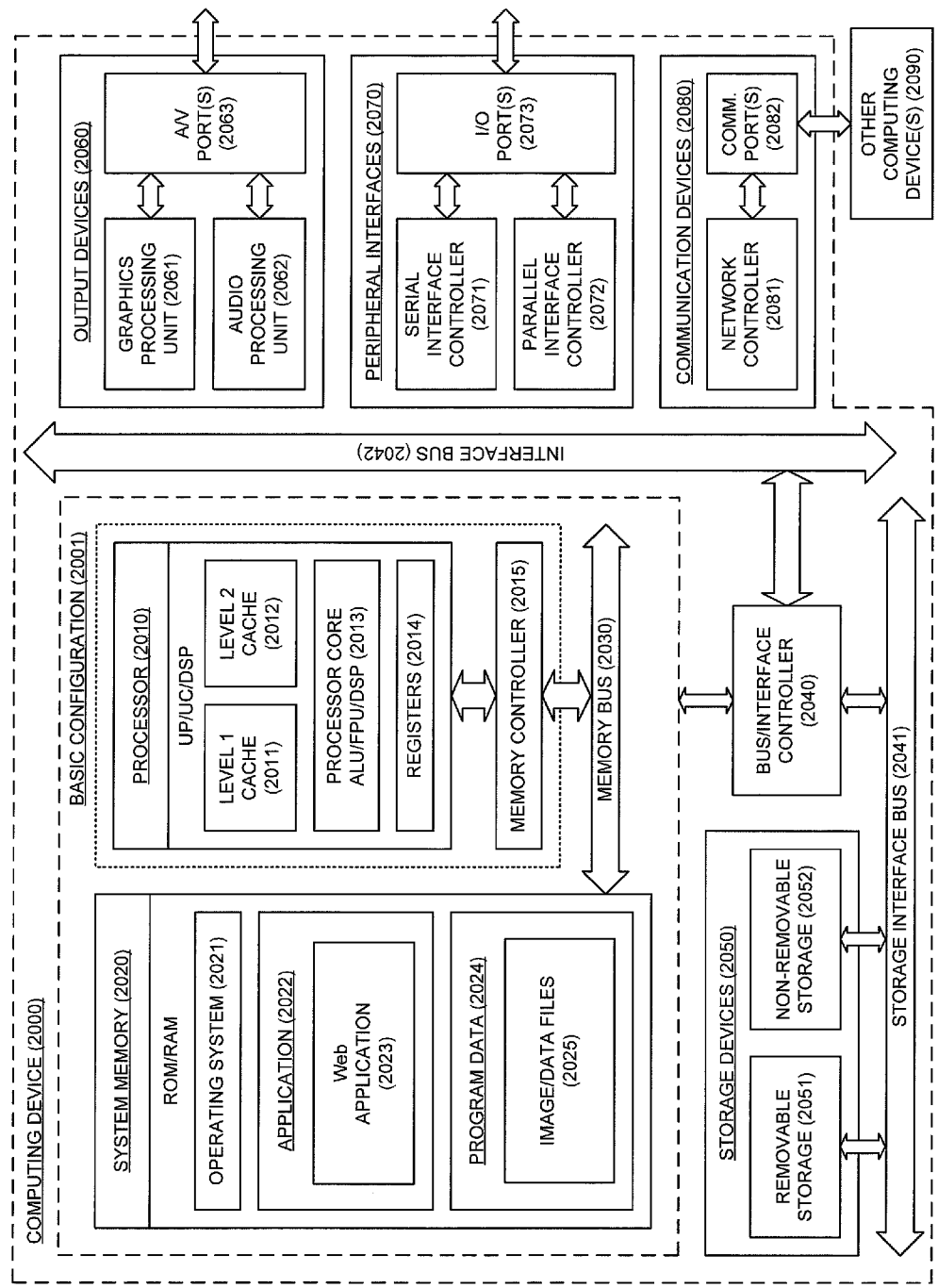
FIG. 17 is a block diagram for a computer system implementation according to aspects of the present invention.

FIG. 17 is a block diagram illustrating an example computing device 2000 that is arranged for creating and performing educational video composited with interactive, dynamically rendered visual aids on the Web. In a very basic configuration 2001, computing device 2000 typically includes one or more processors 2010 and system memory 2020. A memory bus 2030 can be used for communicating between the processor 2010 and the system memory 2020.

Depending on the desired configuration, processor 2010 can be of any type including but not limited to a microprocessor ($\mu$P), a microcontroller ($\mu$C), a digital signal processor (DSP), or any combination thereof. Processor 2010 can include one more levels of caching, such as a level one cache 2011 and a level two cache 2012, a processor core 2013, and registers 2014. The processor core 2013 can include an arithmetic logic unit (ALU), a floating point unit (FPU), a digital signal processing core (DSP Core), or any combination thereof. A memory controller 2015 can also be used with the processor 2010, or in some implementations the memory controller 2015 can be an internal part of the processor 2010.

Depending on the desired configuration, the system memory 2020 can be of any type including but not limited to volatile memory (such as RAM), non-volatile memory (such as ROM, flash memory, etc.) or any combination thereof. System memory 2020 typically includes an operating system 2021, one or more applications 2022, and program data 2024. Application 2022 includes a Web browser that can access a GPU and a Web application 2023. Program Data 2024 includes structured data objects 2025, as described above. In some embodiments, application 2022 can be arranged to operate with program data 2024 on an operating system 2021. This described basic configuration is illustrated in FIG. 17 by those components within dashed line 2001.

Computing device 2000 can have additional features or functionality, and additional interfaces to facilitate communications between the basic configuration 2001 and any required devices and interfaces. For example, a bus/interface controller 2040 can be used to facilitate communications between the basic configuration 2001 and one or more data storage devices 2050 via a storage interface bus 2041. The data storage devices 2050 can be removable storage devices 2051, non-removable storage devices 2052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 2020, removable storage 2051 and non-removable storage 2052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2000. Any such computer storage media can be part of device 2000.

Computing device 2000 can also include an interface bus 2042 for facilitating communication from various interface devices (e.g., output interfaces, peripheral interfaces, and communication interfaces) to the basic configuration 2001 via the bus/interface controller 2040. Example output devices 2060 include a graphics processing unit 2061 and an audio processing unit 2062, which can be configured to communicate to various external devices such as a display or speakers via one or more A/V ports 2063. Example peripheral interfaces 2070 include a serial interface controller 2071 or a parallel interface controller 2072, which can be configured to communicate with external devices such as input devices (e.g., keyboard, mouse, pen, voice input device, touch input device, etc.) or other peripheral devices (e.g., printer, scanner, etc.) via one or more I/O ports 2073. An example communication device 2080 includes a network controller 2081, which can be arranged to facilitate communications with one or more other computing devices 2090 over a network communication via one or more communication ports 2082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 2000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 2000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency trade-offs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A framework for compositing a video with three dimensional graphics in a Web browser, comprising:
   one or more data processing devices;
   at least one graphics processing unit;
   a display device;
   the one or more data processing devices configured to perform playback of video content, and
   the Web browser configured to send instructions to the at least one graphics processing unit;

a memory device storing one or more instructions therein, which when executed by the one or more data processing devices, cause the one or more data processing devices to perform operations comprising:
displaying a scene of video content that includes a background layer, a video layer, and a three dimensional graphics layer on top of the video layer;
adding objects to be included for rendering in the three dimensional graphics layer;
tracking playback timing of the video content;
creating a data model for a moment having a start time, end time, identifier, and a state; and
updating the state of the moment based on the playback timing of the video content, the identifier, and in accordance with the start time and the end time, wherein an object, added to be included for rendering, checks the state of the moment, and when the state of the moment is enabled, the object updates a display state of the object.

2. The framework of claim 1, wherein the memory device further stores one or more instructions, which when executed by the one or more data processing devices, further cause the one or more data processing devices to perform further operations comprising:
performing shading by a shading procedure that renders objects themselves to be displayed on top of the video layer, while displaying the video layer in areas of an animation frame between the objects.

3. The framework of claim 2, wherein the shading procedure includes a fragment shader that calculates a color value for texture for a given coordinate.

4. The framework of claim 1, wherein the data model for the moment includes a camera orientation, wherein when the object determines that the state of the moment is enabled, the camera orientation is used to render the object.

5. A method, performed by one or more processors and a display, for producing video with interactive, dynamically rendered three dimensional graphics, comprising:
selecting, by interacting with the display, one or more video segments consisting of a sequence of video frames of video content being processed by the one or more processors, each of the video segments having an associated time period;
for each selected video segment:
setting the video segment as a middle layer,
adding an interactive graphic content as a top layer associated with the video segment, the interactive graphic content including one or more three dimensional graphic objects,
configuring a fragment shader to reveal the interactive graphic content on top of a video layer, and
adding a background;
creating a moment data object, the moment data object including a start time, end time, identifier, and a state;
playing back the video segment composited with the interactive graphic content in accordance with the fragment shader, the interactive graphic content being rendered with respect to a time period of the video segment; and while playing back the video segment:
tracking playback timing of the video segment;
updating the state of the moment data object based on the playback timing of the video segment, the identifier, and in accordance with the start time and the end time, wherein a three dimensional graphic object checks the state of the moment data object, and when the state of the moment data object is enabled, the three dimensional graphic object updates a display state of the three dimensional graphic object.

6. The method of claim 5, further comprising associating one or more three dimensional graphic objects with the moment data object.

7. The method of claim 6, further comprising storing a camera orientation in the moment data object.

8. The method of claim 5, wherein the fragment shader calculates a color value for texture for a given coordinate.

9. A method for playing back video with composited, interactive, dynamically rendered three dimensional graphics, comprising:
loading a video application having one or more scenes that include video content;
detecting whether a scene has associated interactive graphic content, the associated interactive graphic content including one or more three dimensional graphic objects and a shader for revealing the one or more three dimensional graphic objects composited with the video content;
when the scene includes interactive graphic content:
initializing a virtual camera and renderer;
periodically updating a state of a moment variable based on a start time and an end time of the moment variable and timing of the video content; and
while the scene is being played back,
at time points in the scene, determining whether a three dimensional graphic object from among the one or more three dimensional graphic objects is to be rendered,
at each video frame:
the three dimensional graphic object to be rendered checking the state of the moment variable,
updating a display view of the three dimensional graphic object when the state of the moment variable indicates that a moment is enabled, and
rendering the updated display view of the three dimensional graphic object in the scene using the shader.

10. The method of claim 9, wherein the updating of the display view of the three dimensional graphic object includes determining one or more properties of the three dimensional graphic object based on a current time relative to the start time and the end time of the moment variable.

11. The method of claim 10, wherein a property of the one or more properties includes a position of the three dimensional graphic object, and the position is determined based on a ratio of the current time to a time period between the start time to the end time.

* * * * *